2 Sheets--Sheet 1.
I. T. BARTON.
Thrashing-Machines.
No. 139,355. Patented May 27, 1873.
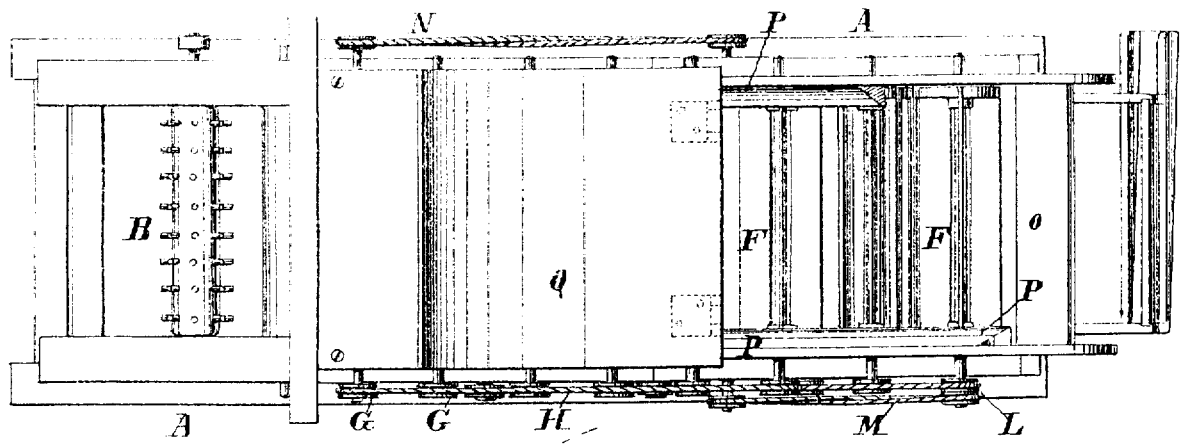
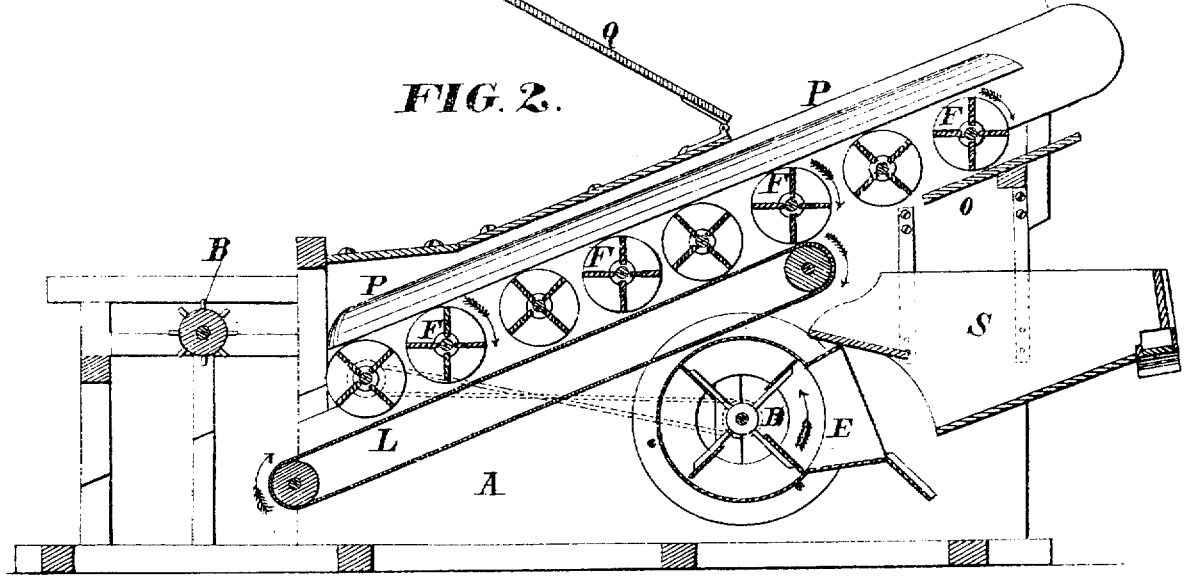
WITNESSES:
Jas. Scheitlin
W. H. Pearce
INVENTOR:
Isaac T. Barton
By Knight Bros. Attorneys.

I. T. BARTON.
Thrashing-Machines.

Patented May 27, 1873.

WITNESSES:

INVENTOR:
Isaac T. Barton
By Knight Bro. Attorneys.

UNITED STATES PATENT OFFICE

ISAAC T. BARTON, OF UNION CITY, MICHIGAN.

IMPROVEMENT IN THRASHING-MACHINES.

Specification forming part of Letters Patent No. 139,355, dated May 27, 1873; application filed May 10, 1873.

*To all whom it may concern:*

Be it known that I, ISAAC T. BARTON, of Union City, Branch county, State of Michigan, have invented an Improvement in Grain Thrashing and Separating Machines, of which the following is a specification:

Nature and Objects of the Invention.

The novelty in my machine relates chiefly to the straw carrying and separating apparatus. The straw passes from the thrashing-cylinder to a carrier consisting of a series of fans the rotary movements of which, in addition to shaking the straw, produce an upward current of air throughout the whole length of the carrier, so as to lighten up the straw and effect a complete separation of the grain, which descends by its gravity through the spaces between the wings of the fans, and is conducted to and through the winnowing apparatus in customary manner.

Description of the Drawings.

In the accompanying drawings, Fig. 1 is a plan or top view of a thrashing-machine, representing especially the separating apparatus to which my invention relates. Fig. 2 is a horizontal section of the same.

General Description.

Figure 3:
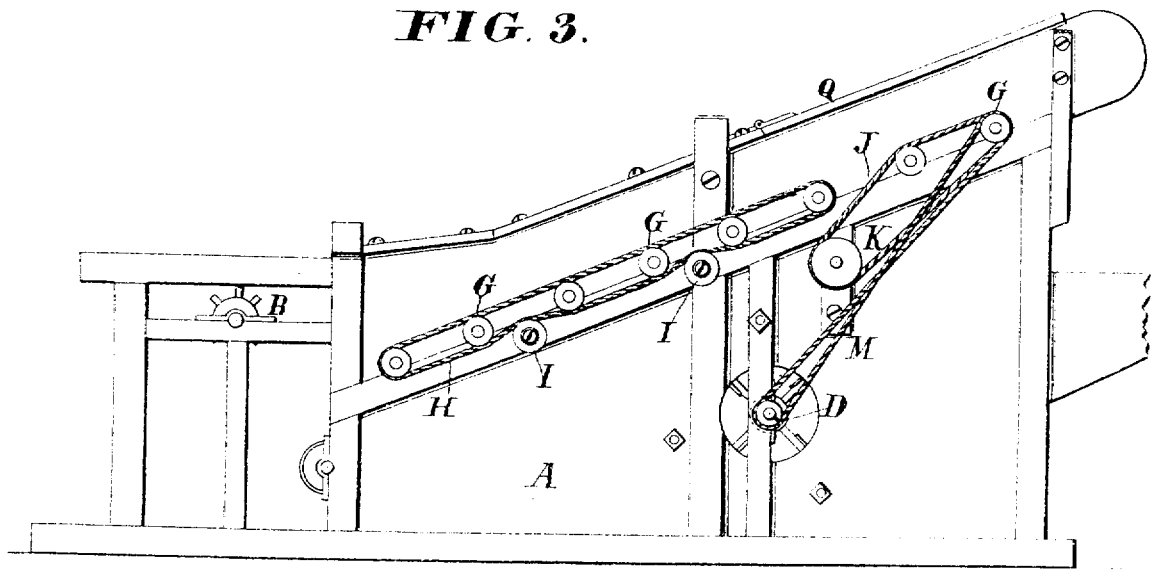
Fig. 3 is a side elevation thereof.
Figure 4:
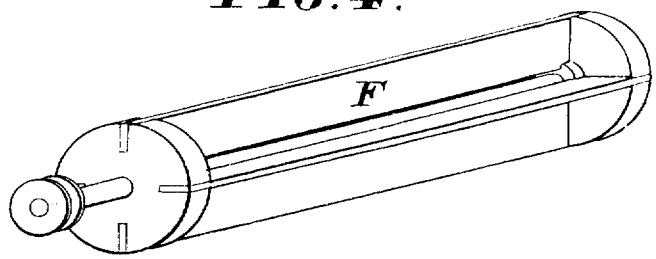
Fig. 4 is a perspective view of one of the separating-fans.

The frame A, thrashing-cylinder B, concave winnowing apparatus D E S, and other parts of the machine not herein specifically described, may be constructed in any usual or suitable manner. The straw carrier and separator to which my improvement especially relates consists of a series of fans, F F F, arranged in an ascending plane toward the tail of the machine. The projecting ends of the fan-shafts are provided with pulleys G, through the medium of which a number of them are connected by belts H H', which may be arranged as illustrated in Fig. 3, the intermediate pulleys I serving to keep the traction of the belt on the driving-pulleys. The rearmost two of the fans I connect, as shown, by means of a belt, J, to the transverse shaft K, which is employed to carry and run a grain-apron, L, of common form. The power is transmitted by a belt to the thrashing-cylinder and fan-shaft D in usual manner. From the fan-shaft D belts M and N drive the two series of fans F F, which are connected, as already described. P P are chutes which prevent the descending grain from falling down beyond the ends of the fans. The case of the straw-carrier may be surmounted by a cover, Q, which is shown elevated in Figs. 1 and 2, exposing the fans F in the former figure.

Operation.

The grain being thrashed by the cylinder B, as much of it as does not pass through the slot concave goes with the straw to the fans F, which reach from near the said cylinder and concave to the tail of the machine. The fans run "overshot," passing the straw and chaff from one to another and creating a strong current of air upward and rearward, which, operating beneath the straw, lightens it up and causes the grain to be completely separated by its own gravity. The grain, falling through and between the fans F and the apron L and board O is by them delivered to the shoe S of the winnowing apparatus with such chaff as has not been carried off with the straw.

The fans may run from two hundred to three hundred revolutions per minute, or about one-half the speed of the winnowing-fan D E. I do not limit myself to these or any exact proportions, but have used the above with good effect.

I am aware that straw-carriers have before been made in the form of horizontal rotary beaters constructed and arranged in various ways, and therefore do not claim such beaters broadly; but I am not aware that such beaters have ever been constructed with radial wings or blades to operate as fans, producing an upward blast beneath the straw; and I have found in practice that such fans produce a very important and beneficial effect in separating the straw and avoiding much waste of grain. I am aware that grain-separators have before been made with straw-carriers constituted of a series of reels or rotary beaters; this, therefore, I do not claim.

I have found, in practice, great benefit to result from my mode of constructing the beaters with flat radial wings so that they operate as fans, producing a constant and strong blast beneath the straw throughout the length of the carrier. This effectually prevents grain from being carried over with the straw.

Claims.

The following is claimed as new:

1. The series of fans F, arranged, as herein described, to conduct the straw from the thrashing-cylinder and constructed with flat radial wings to produce a current of air beneath the straw to assist in separating the grain, as explained.

2. The combination of the beater-fans F, constructed, as described, with the thrashing-cylinder B, grain-carrier L, and winnowing apparatus D E S, all arranged to operate substantially as and for the purposes set forth.

To the above specification I hereunto set my hand this 5th day of April, 1873.

ISAAC T. BARTON.

Witnesses:
OCTAVIUS KNIGHT,
WALTER ALLEN.